US012586808B2

(12) United States Patent
Yoon et al.

(10) Patent No.: US 12,586,808 B2
(45) Date of Patent: Mar. 24, 2026

(54) APPARATUS AND METHOD FOR MANUFACTURING UNIT CELLS

(71) Applicant: LG Energy Solution, Ltd., Seoul (KR)

(72) Inventors: Se Hyun Yoon, Daejeon (KR); Dong Hyeuk Park, Daejeon (KR); Chun Ho Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 634 days.

(21) Appl. No.: 17/918,485

(22) PCT Filed: Jul. 20, 2021

(86) PCT No.: PCT/KR2021/009293
§ 371 (c)(1),
(2) Date: Oct. 12, 2022

(87) PCT Pub. No.: WO2022/019599
PCT Pub. Date: Jan. 27, 2022

(65) Prior Publication Data
US 2023/0148346 A1     May 11, 2023

(30) Foreign Application Priority Data

Jul. 20, 2020   (KR) ........................ 10-2020-0089911

(51) Int. Cl.
*H01M 10/04*       (2006.01)
*B65H 31/00*       (2006.01)
*B65H 35/00*       (2006.01)

(52) U.S. Cl.
CPC .... *H01M 10/0404* (2013.01); *B65H 35/0006* (2013.01); *B65H 31/00* (2013.01); *B65H 2553/42* (2013.01)

(58) Field of Classification Search
CPC .......... H01M 10/0404; B65H 35/0006; B65H 31/00; B65H 2553/42
See application file for complete search history.

(56) References Cited

U.S. PATENT DOCUMENTS 6,021,887 A * 2/2000 Redden ................. H01M 10/14
                                                      198/463.4
2006/0254209 A1* 11/2006 Hopwood ............. H01M 10/14
                                                       53/64
(Continued)

FOREIGN PATENT DOCUMENTS

CN          109155424 A       1/2019
CN          110088968 A  *   8/2019  ........... B65H 23/038
(Continued)

OTHER PUBLICATIONS

Machine Translation of JP-2019079768-A (Oct. 9, 2025) (Year: 2025).*

(Continued)

*Primary Examiner* — Matthew J Merkling
(74) *Attorney, Agent, or Firm* — Lerner David LLP

(57)                ABSTRACT

An apparatus for manufacturing unit cells includes reels, rollers, conveyors, headers, and a cutter. A lower separator sheet is unwound from a lower separator reel. A feeding roller moves the lower separator sheet in a first direction. A conveyor moves a first electrode in a second direction parallel to the first direction. A first header conveys that electrode from the conveyor and onto the lower separator sheet. An upper separator sheet is unwound from an upper separator reel. Another feeding roller moves, in the first direction, a first ordered stack of the lower separator sheet, first electrode, and upper separator sheet. Another conveyor moves a second electrode in the second direction. Another header conveys that electrode from the second conveyor and onto the upper separator sheet. The cutter cuts, at preset intervals, a second ordered stack of the lower separator sheet, first electrode, upper separator sheet, and second electrode.

15 Claims, 4 Drawing Sheets

(56) References Cited

U.S. PATENT DOCUMENTS

| | | | | |
|---|---|---|---|---|
| 2014/0101928 A1* | 4/2014 | Sato | .................. | H01M 10/0583 |
| | | | | 29/730 |
| 2016/0211544 A1* | 7/2016 | Yanagi | .............. | B29C 66/81463 |
| 2019/0131659 A1 | 5/2019 | Nam | | |
| 2020/0067051 A1 | 2/2020 | Yamashita et al. | | |
| 2020/0235433 A1 | 7/2020 | Kim et al. | | |
| 2021/0098817 A1 | 4/2021 | Lee | | |
| 2021/0234186 A1 | 7/2021 | Kim et al. | | |
| 2022/0069412 A1* | 3/2022 | Masada | .................... | B26D 1/24 |
| 2022/0200038 A1* | 6/2022 | Bae | ................... | H01M 10/0404 |
| 2023/0126524 A1 | 4/2023 | Jung et al. | | |

FOREIGN PATENT DOCUMENTS

| | | | | | |
|---|---|---|---|---|---|
| CN | 110247124 A | | 9/2019 | | |
| CN | 110352521 A | | 10/2019 | | |
| CN | 113574710 A | * | 10/2021 | ............. | B32B 37/10 |
| EP | 3951972 A1 | | 2/2022 | | |
| EP | 4109610 A1 | | 12/2022 | | |
| JP | 2012074402 A | | 4/2012 | | |
| JP | 2019079768 A | * | 5/2019 | | |
| JP | 2019139961 A | | 8/2019 | | |
| JP | 2019186229 A | | 10/2019 | | |
| KR | 101040704 B1 | | 6/2011 | | |
| KR | 101280068 B1 | | 6/2013 | | |
| KR | 101287415 B1 | * | 7/2013 | ........ | H01M 10/0436 |
| KR | 101315809 B1 | | 10/2013 | | |
| KR | 20160094182 A | | 8/2016 | | |
| KR | 101823192 B1 | | 1/2018 | | |
| KR | 20180119946 A | | 11/2018 | | |
| KR | 102101831 B1 | | 4/2020 | | |
| KR | 20200058956 A | | 5/2020 | | |
| KR | 20200084254 A | | 7/2020 | | |
| KR | 102285417 B1 | * | 8/2021 | .............. | H01M 4/04 |
| WO | WO-2019044549 A1 | * | 3/2019 | .............. | H01M 4/04 |
| WO | WO2018154776 A1 | | 7/2019 | | |
| WO | 2020130184 A1 | | 6/2020 | | |

OTHER PUBLICATIONS

Machine Translation of KR-102285417-B1 (Oct. 9, 2025) (Year: 2025).*

Machine Translation of WO-2019044549-A1 (Oct. 9, 2025) (Year: 2025).*

Machine Translation of KR-101287415-B1 (Oct. 9, 2025) (Year: 2025).*

Extended European Search Report including Written Opinion for Application No. 21847268.6 dated Aug. 17, 2023, pp. 1-7.

International Search Report for Application No. PCT/KR2021/009293 mailed Nov. 2, 2021, pp. 1-3.

Hui, Chen, "Hydraulic and Pneumatic Technology", Railway Publishing House, p. 140(Dec. 31, 2019). 18 pgs.

* cited by examiner

APPARATUS AND METHOD FOR MANUFACTURING UNIT CELLS

CROSS-REFERENCE TO RELATED APPLICATION

The present application is a national phase entry under 35 U.S.C. § 371 of International Application No. PCT/KR2021/009293 filed on Jul. 20, 2021, which claims priority from Korean Patent Application No. 10-2020-0089911, filed on Jul. 20, 2020, and now published as WO 2022/019599 A1, each of which are hereby incorporated by reference in their entireties.

FIELD

The present invention relates to an apparatus and method for manufacturing unit cells, and more particularly, to an apparatus and method for manufacturing unit cells, capable of easily checking and correcting deviation of an electrode from the normal position when the unit cell is manufactured by stacking the electrode and a separator sheet.

BACKGROUND

In general, there are several types of secondary batteries such as nickel cadmium batteries, nickel hydrogen batteries, lithium-ion batteries, and lithium-ion polymer batteries. These secondary batteries have been applied to and used for not only small products such as digital cameras, P-DVDs, MP3Ps, cellular phones, PDAs, portable game devices, power tools, and E-bikes, but also large products requiring high power such as electric vehicles and hybrid vehicles, and power storage devices or backup-power storage devices for storing surplus generated power and new renewable energy.

In order to manufacture the secondary batteries, first of all, electrode active material slurry is applied to a positive electrode collector and a negative electrode collector to manufacture a positive electrode and a negative electrode, and the positive electrode and the negative electrode are stacked on both sides of a separator to form an electrode assembly having a predetermined shape. Subsequently, the electrode assembly is accommodated in a battery case, and the battery case is sealed after injecting an electrolyte therein.

The electrode assemblies are classified into various types. For example, there are: a simple stack type in which positive electrodes, separators, and negative electrodes are simply stacked in an alternate and continuous manner without manufacturing unit cells; a lamination and stack (L&S) type in which, first, unit cells are manufactured by using positive electrodes, separators, and negative electrodes, and then, the unit cells are stacked; a stack and folding (S&F) type in which a plurality of electrodes or unit cells are spaced and attached on one surface of a separator sheet having a length elongated to the one side, and then, the separator sheet is repeatedly folded from one end in the same direction; and a Z-folding type in which a plurality of electrodes or unit cells are alternately attached on one surface and the other surface of a separator sheet having a length elongated to the one side, and then, the separator sheet is folded from one end in a specific direction and then folded in the opposite direction in an alternate and repetitive manner.

Among these types, a unit cell may be manufactured first in order to manufacture an electrode assembly in the lamination and stack type, the stack and folding type, or the Z-folding type. Generally, in order to manufacture the unit cell, separators are respectively stacked on the top and bottom surfaces of a central electrode while the central electrode is moved to one side by a conveyor belt or the like. Subsequently, an upper electrode is further stacked on the uppermost end. If necessary, a lower electrode may be further stacked on the lowermost end. Then, a laminating process is performed to apply heat and pressure to a stack in which the electrodes and the separators are stacked. By performing this laminating process, the electrodes and the separators are bonded, and the unit cell may be securely formed.

However, according to the related art, all of a plurality of separator sheets and electrode sheets move on a single line in the same direction. Also, when an electrode sheet is cut at preset intervals by using a cutter to manufacture an electrode, the electrode is immediately placed on a separator sheet. Thus, it is not easy to check whether or not the electrode deviates from the normal position after the electrode sheet is cut. Moreover, even if the electrode deviates from the normal position, it is not easy to correct the deviation.

Also, the position of the central electrode stacked between two separator sheets is recognized by a sensor, and then, the timing of inputting the other electrodes is determined. However, since the central electrode is stacked and hidden between the two separator sheets, the position of an electrode tab of the central electrode, which protrudes to one side of the separator, is recognized by a sensor in order to recognize the position of the central electrode. Here, when a portion of the electrode tab is damaged, folded, or bent, the sensor does not accurately recognize the position of the central electrode. Accordingly, a defect occurs at a unit cell. Furthermore, when these electrodes are continuously input, defects occur continuously at unit cells.

PRIOR ART DOCUMENTS

Patent Documents (Patent Document 1) Japanese Patent Publication No. 2019-139961

SUMMARY OF THE DISCLOSURE

An object of the present invention for solving the above problems is to provide an apparatus and method for manufacturing unit cells, capable of easily checking and correcting deviation of an electrode from the normal position when the unit cell is manufactured by stacking the electrode and a separator sheet.

The objects of the present invention are not limited to the aforementioned objects, but other objects not described herein will be clearly understood by those skilled in the art from descriptions below.

To solve the above problems, an apparatus for manufacturing unit cells according to an embodiment of the present invention includes: a lower separator reel from which a lower separator sheet is unwound; a first feeding roller configured to move the lower separator sheet in a first direction; a first conveyor configured to move a first electrode in a second direction parallel to the first direction; a first header configured to convey the first electrode from the first conveyor and place the first electrode on a top surface of the lower separator sheet; an upper separator reel from which an upper separator sheet is unwound; a second feeding roller configured to move, in the first direction, a first stack in which the lower separator sheet, the first electrode, and the upper separator sheet are stacked in this order; a second conveyor configured to move a second electrode in the second direction; a second header configured to convey the second electrode from the second conveyor and place the second electrode on a top surface of the upper separator sheet; and a cutter configured to cut, at preset intervals, a second stack in which the lower separator sheet, the first electrode, the upper separator sheet, and the second electrode are stacked in this order.

Also, the apparatus may further include a first vision sensor which is disposed between the lower separator sheet and the first conveyor and captures an image of the first electrode before the first electrode is placed on the top surface of the lower separator sheet.

Also, the apparatus may further include a second vision sensor which is disposed between the first stack and the second conveyor and captures an image of the second electrode before the second electrode is placed on the top surface of the upper separator sheet.

Also, the apparatus may further include a third vision sensor which is disposed above the first conveyor to capture an image of the first electrode.

Also, the apparatus may further include a fourth vision sensor which is disposed above the second conveyor to capture an image of the second electrode.

Also, the first header may convey the first electrode in a third direction perpendicular to both the first direction and the second direction, and the second header may convey the second electrode in a fourth direction parallel to the third direction and perpendicular to both the first direction and the second direction.

Also, the apparatus may further include first nip rollers which are respectively disposed on both surfaces of the lower separator sheet and the first electrode, wherein when the first electrode is placed on the top surface of the lower separator sheet, the first nip rollers press the lower separator sheet and the first electrode while rotating.

Also, the apparatus may further include second nip rollers which are respectively disposed on both surfaces of the second stack and press the second stack while rotating.

Also, the apparatus may further include a magazine in which the plurality of unit cells are sequentially accommodated and stacked.

Also, the first conveyor and the second conveyor may be arranged in a line along the second direction.

Also, the apparatus may further include: a first electrode reel from which is unwound a first electrode sheet in which the first electrode is formed; and a second electrode reel from which is unwound a second electrode sheet in which the second electrode is formed.

To solve the above problems, a method for manufacturing unit cells according to an embodiment of the present invention includes: unwinding a lower separator sheet from a lower separator reel and moving the lower separator sheet in a first direction; moving a first electrode in a second direction parallel to the first direction by using a first conveyor; conveying the first electrode from the first conveyor and placing the first electrode on a top surface of the lower separator sheet, by using a first header; unwinding an upper separator sheet from an upper separator reel and moving the upper separator sheet in the first direction; stacking the upper separator sheet above the lower separator sheet and on a top surface of the first electrode to form a first stack; moving a second electrode in the second direction by using a second conveyor; conveying the second electrode from the second conveyor and placing the second electrode on a top surface of the upper separator sheet, by using a second header, thereby forming a second stack; and cutting the second stack at preset intervals by using a cutter to manufacture a unit cell.

Also, in the placing of the first electrode on the top surface of the lower separator sheet, a first vision sensor, which is disposed between the lower separator sheet and the first conveyor, may capture an image of the first electrode before the first electrode is placed on the top surface of the lower separator sheet.

Also, in the placing of the second electrode on the top surface of the upper separator sheet, a second vision sensor, which is disposed between the first stack and the second conveyor, may capture an image of the second electrode before the second electrode is placed on the top surface of the upper separator sheet.

Also, in the moving of the first electrode in the second direction, a third vision sensor disposed above the first conveyor may capture an image of the first electrode.

Also, in the moving of the second electrode in the second direction, a fourth vision sensor disposed above the second conveyor may capture an image of the second electrode.

Other specific features of the present invention are included in the detailed description and drawings.

The embodiments of the present invention may have at least the following effects.

The electrode is moved by the separate header. Thus, even if the electrode deviates from the normal position, the deviation may be easily corrected.

Also, instead of directly checking the position of the electrode by using the electrode tab, the position of the electrode itself is directly checked by the vision sensor. Thus, it may be easily checked whether or not the electrode deviates from the normal position, and the occurrence of defects of the unit cell may be prevented.

Also, the first conveyor is disposed close to the input position of the first electrode, and the second conveyor is disposed close to the input position of the second electrode. Thus, the first electrode and the second electrode may be moved to the appropriate input positions along the shortest route, thus reducing unnecessary movement and efficiently manufacturing the unit cells.

Also, the conveyors for conveying and supplying the electrodes are disposed in parallel to one side of the separator sheet. Thus, the overall volume of the equipment may also be reduced.

The effects according to the present invention are not limited to those exemplified above, and more various effects are included in the present specification.

DETAILED DESCRIPTION

Figure 1:
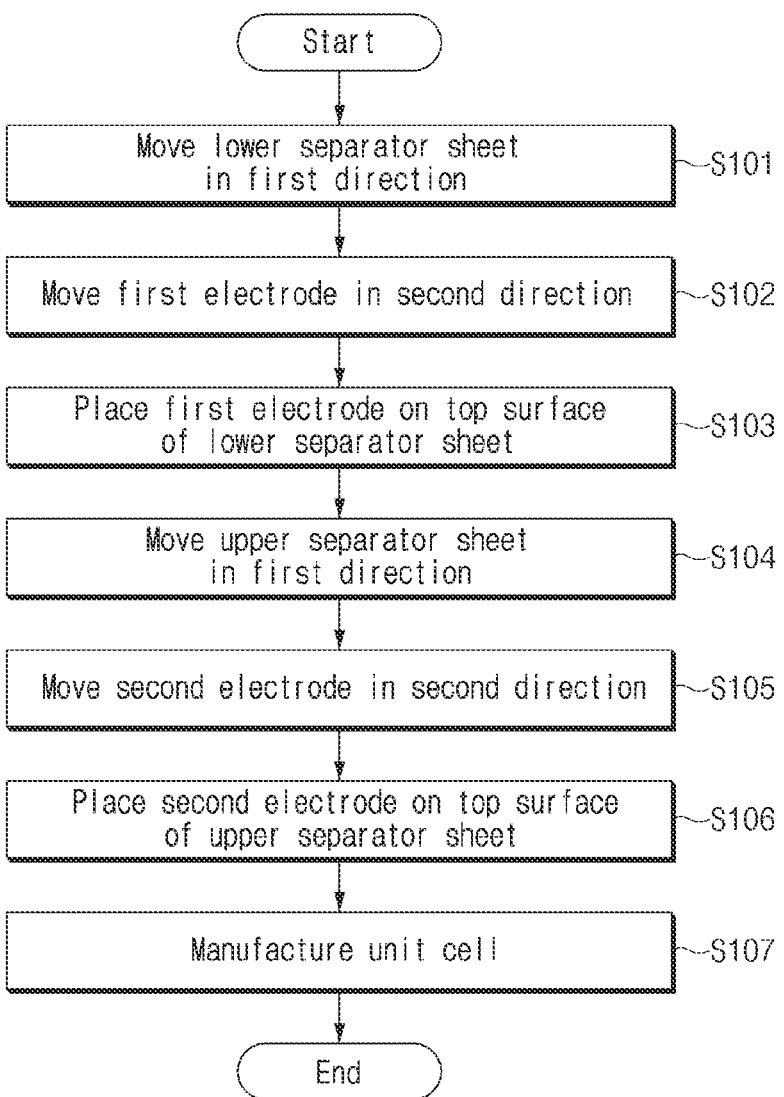
FIG. 1 is a flowchart of a method for manufacturing unit cells according to an embodiment of the present invention.

Advantages and features of the present invention, and implementation methods thereof will be clarified through following embodiments described in detail with reference to the accompanying drawings. The present invention may, however, be embodied in various different forms and should not be construed as limited to the embodiments set forth herein. Rather, these embodiments are provided so that this disclosure will be thorough and complete, and will fully convey the scope of the present invention to those skilled in the art to which the present invention belongs. Further, the present invention is defined only by scopes of claims. Like reference numerals refer to like elements throughout.

Unless otherwise defined, all terms (including technical and scientific terms) used herein have the same meaning as commonly understood by those skilled in the art to which the present invention belongs. Also, terms as defined in a generally used dictionary are not construed ideally or excessively unless defined apparently and specifically.

The terms used in this specification are used only to explain embodiments while not limiting the present invention. In this specification, the singular forms include the plural forms as well, unless the context clearly indicates otherwise. The meaning of "comprises" and/or "comprising" used in the specification does not exclude the presence or addition of one or more components other than the mentioned component.

Hereinafter, preferred embodiments of the present invention will be described in detail with reference to the accompanying drawings.

FIG. 1 is a flowchart of a method for manufacturing unit cells according to an embodiment of the present invention.

According to an embodiment of the present invention, an electrode is moved by a separate header. Thus, even if the electrode deviates from a normal position, the deviation may be easily corrected. Also, instead of directly checking the position of an electrode by using an electrode tab, the position of the electrode itself is directly checked by a vision sensor. Thus, it may be easily checked whether or not the electrode deviates from the normal position, and the occurrence of defects of a unit cell 2 may be prevented. Also, a first conveyor 31 is disposed close to an input position of a first electrode 1112, and a second conveyor 32 is disposed close to an input position of a second electrode 1122. Thus, the first electrode 1112 and the second electrode 1122 may be moved to the appropriate input positions along the shortest route, thus reducing unnecessary movement and efficiently manufacturing the unit cell 2. Also, the conveyors for conveying and supplying the electrodes are disposed in parallel to one side of a separator sheet. Thus, the overall volume of the equipment may also be reduced.

To this end, a method for manufacturing unit cells according to an embodiment of the present invention includes: unwinding a lower separator sheet 1211 from a lower separator reel 121 and moving the lower separator sheet in a first direction D1; moving a first electrode 1112 in a second direction D2 parallel to the first direction D1 by using a first conveyor 31; conveying the first electrode 1112 from the first conveyor 31 and placing the first electrode on a top surface of the lower separator sheet 1211, by using a first header 141; unwinding an upper separator sheet 1221 from an upper separator reel 122 and moving the upper separator sheet in the first direction D1; stacking the upper separator sheet 1221 above the lower separator sheet 1211 and on a top surface of the first electrode 1112 to form a first stack 21; moving a second electrode 1122 in the second direction D2 by using a second conveyor 32; conveying the second electrode 1122 from the second conveyor 32 and placing the second electrode on a top surface of the upper separator sheet 1221, by using a second header 142, thereby forming a second stack 22; and cutting the second stack 22 at preset intervals by using a cutter 17 to manufacture a unit cell 2.

Hereinafter, each of the processes illustrated in the flowchart of FIG. 1 will be described in detail with reference to FIGS. 2 and 3.

Figure 2:
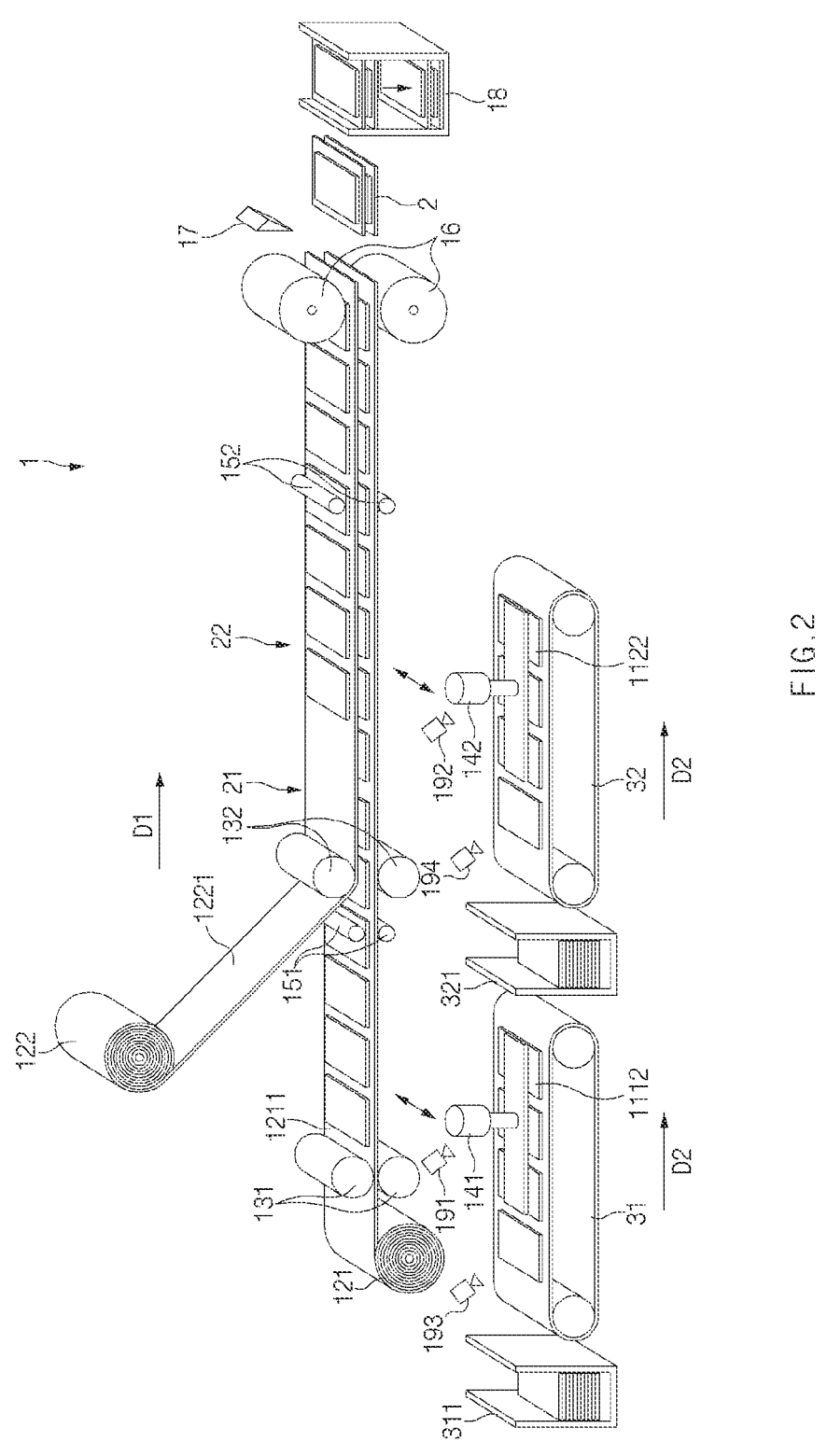
FIG. 2 is a schematic view of an apparatus 1 for manufacturing unit cells according to an embodiment of the present invention.

FIG. 2 is a schematic view of an apparatus 1 for manufacturing unit cells according to an embodiment of the present invention.

As illustrated in FIG. 2, the apparatus 1 for manufacturing unit cells according to an embodiment of the present invention includes: a lower separator reel 121 from which a lower separator sheet 1211 is unwound; a first feeding roller 131 which moves the lower separator sheet 1211 in a first direction D1; a first conveyor 31 which moves a first electrode 1112 in a second direction D2 parallel to the first direction D1; a first header 141 which conveys the first electrode 1112 from the first conveyor 31 and places the first electrode on a top surface of the lower separator sheet 1211; an upper separator reel 122 from which an upper separator sheet 1221 is unwound; a second feeding roller 132 which moves, in the first direction D1, a first stack 21 in which the lower separator sheet 1211, the first electrode 1112, and the upper separator sheet 1221 are stacked in this order; a second conveyor 32 which moves a second electrode 1122 in the second direction D2; a second header 142 which conveys the second electrode 1122 from the second conveyor 32 and places the second electrode on a top surface of the upper separator sheet 1221; and a cutter 17 which cuts, at preset intervals, a second stack 22 in which the lower separator sheet 1211, the first electrode 1112, the upper separator sheet 1221, and the second electrode 1122 are stacked in this order.

The lower separator reel 121 is a reel on which the lower separator sheet 1211 is wound, and the lower separator sheet 1211 is unwound from the lower separator reel 121. Also, the first feeding roller 131 moves the lower separator sheet 1211 in the first direction D1. Meanwhile, the first conveyor 31 moves the first electrode 1112 in the second direction D2 parallel to the first direction D1 in which the lower separator sheet 1211 moves. Thus, the first electrode 1112 and the lower separator sheet 1211 move in parallel to each other.

Subsequently, the first electrode 1112 adheres to the first header 141, and is then conveyed from the first conveyor 31 and placed on the top surface of the lower separator sheet 1211. By repeating this process, a plurality of first electrodes 1112 may be stacked on the lower separator sheet 1211 while being spaced in a line in a longitudinal direction of the lower separator sheet 1211.

A first nip roller 151 may be provided in plurality, and may be disposed on each of both surfaces of the lower separator sheet 1211 and the first electrode 1112. Also, when the first electrode 1112 is placed on the top surface of the lower separator sheet 1211, the first nip rollers 151 may press the lower separator sheet 1211 and the first electrode 1112 while rotating. Accordingly, the lower separator sheet 1211 and the first electrode 1112 may be bonded to each other more firmly.

Meanwhile, the upper separator reel 122 is a reel on which the upper separator sheet 1221 is wound, and the upper separator sheet 1221 is unwound from the upper separator reel 122. Also, the upper separator sheet 1221 is stacked on the top surface of the first electrode 1112. Accordingly, a first stack 21 is formed in which the lower separator sheet 1211, the first electrode 1112, and the upper separator sheet 1221 are stacked in this order. The first stack 21 may be formed such that the plurality of first electrodes 1112 are stacked between the separator sheets 1211 and 1221 while being spaced in a line in the longitudinal directions of the separator sheets 1211 and 1221. Also, a second feeding roller 132 moves the first stack 21 in the first direction D1. Meanwhile, the second conveyor 32 moves the second electrode 1122 in the second direction D2 parallel to the first direction D1 in which the first stack 21 moves. Thus, the second electrode 1122 and the first stack 21 move in parallel to each other.

The first conveyor 31 and the second conveyor 32 move the first electrode 1112 and the second electrode 1122 in the second direction D2, respectively. Thus, the first conveyor 31 and the second conveyor 32 may be disposed in a line along the second direction D2. Particularly, since the first electrode 1112 is placed on the separator sheet earlier than the second electrode 1122, the first conveyor 31 may be disposed in front of the second conveyor 32. As described above, the conveyors for conveying and supplying the electrodes are not disposed in series with respect to a traveling direction, but disposed in parallel to one side of the separator sheets. Thus, the overall volume of the equipment may also be reduced.

Subsequently, the second electrode 1122 adheres to the second header 142, and is then conveyed from the second conveyor 32 and placed on the top surface of the upper separator sheet 1221. Accordingly, a second stack 22 is formed in which the lower separator sheet 1211, the first electrode 1112, the upper separator sheet 1221, and the second electrode 1122 are stacked in this order. The second stack 22 may be formed such that a plurality of second electrodes 1122 are stacked on the upper separator sheet 1221 while being spaced in a line in the longitudinal direction of the upper separator sheet 1221. Since the first electrode 1112 and the second electrode 1122 have different sizes, distances therebetween may be different. However, preferably, the first electrode 1112 and the second electrode 1122 are disposed such that the centers thereof are aligned with each other.

As described above, the first electrode 1112 and the second electrode 1122 are not input directly, but are moved by the separate headers. Thus, even if the electrode deviates from the normal position, the deviation may be easily checked and corrected.

Each of the first electrode 1112 and the second electrode 1122 may be manufactured by applying slurry of an electrode active material, a conductive material, and a binder onto an electrode collector and then drying and pressing the same. According to an embodiment of the present invention, the first electrode 1112 and the second electrode 1122 may be manufactured in a separate electrode manufacturing process. Also, the first electrode 1112 may be supplied to a first electrode magazine 311 or a first electrode table (not shown) provided on one side of the lower separator sheet 1211, and then move to the first conveyor 31. In addition, the second electrode 1122 may be supplied to a second electrode magazine 321 or a second electrode table (not shown) provided on one side of the first stack 21, and then move to the second conveyor 32. Here, the first electrode 1112 and the second electrode 1122 may be electrodes having different polarities. That is, when the first electrode 1112 is a positive electrode, the second electrode 1122 may be a negative electrode. When the first electrode 1112 is a negative electrode, the second electrode 1122 may be a positive electrode.

A second nip roller 152 may be provided in plurality, and may be disposed on each of both surfaces of the second stack 22. Also, it may press the second stack 22 while rotating. Accordingly, the inner parts of the second stack 22 may be bonded to each other more firmly.

A laminator laminates the second stack 22, in which the electrodes 1112 and 1122 and the separator sheets 1211 and 1221 are stacked, by heating and pressing the same. The laminating is referred to as heating and the pressing a stack 20 to bond the electrodes 1112 and 1122 and the separator sheets 1211 and 1221. The laminator may include a heating roller 16 that heats and presses the stack 20 while rotating as illustrated in FIG. 2, and may include a heater (not shown) that uniformly heats and presses the entire surface of the stack 20.

The method for manufacturing unit cells according to an embodiment of the present invention may be performed as below by using the apparatus 1 for manufacturing unit cells.

As illustrated in FIG. 2, first of all, the lower separator sheet 1211 is unwound from the lower separator reel 121 and moves in the first direction D1 (S101). Also, the first electrode 1112, which has been manufactured in the separate electrode manufacturing process, is supplied to the first electrode magazine 311 or the first electrode table (not shown) provided on one side of the lower separator sheet 1211. Subsequently, the first conveyor 31 moves the first electrode 1112 in the second direction D2 parallel to the first direction D1 (S102). Then, the first electrode 1112 adheres to the first header 141, and is then conveyed from the first conveyor 31 and placed on the top surface of the lower separator sheet 1211 (S103).

Meanwhile, the upper separator sheet 1221 is unwound from the upper separator reel 122 and moves in the first direction D1 (S104). As the upper separator sheet 1221 is stacked on the top surface of the first electrode 1112, the first stack 21 is formed. Also, the second electrode 1122, which has been manufactured in the separate electrode manufacturing process, is supplied to the second electrode magazine 321 or the second electrode table (not shown) provided on one side of the first stack 21. Subsequently, the second conveyor 32 moves the second electrode 1122 in the second direction D2 parallel to the first direction D1 (S105). Then, the second electrode 1122 adheres to the second header 142 and is conveyed from the second conveyor 32. Then, the second electrode 1122 is placed on the top surface of the upper separator sheet 1221 (S106). Accordingly, the second stack 22 is formed. Also, as the second stack 22 is cut at preset intervals by the cutter 17, the unit cell 2 may be manufactured.

Meanwhile, unit cells 2 formed by cutting the second stack 22 are sequentially accommodated and stacked in a magazine 18. That is, when the unit cell 2 is formed, the unit cells 2 may be inserted into the magazine 18 one by one and sequentially stacked therein. Accordingly, an electrode assembly according to an embodiment of the present invention may be manufactured.

Figure 3:
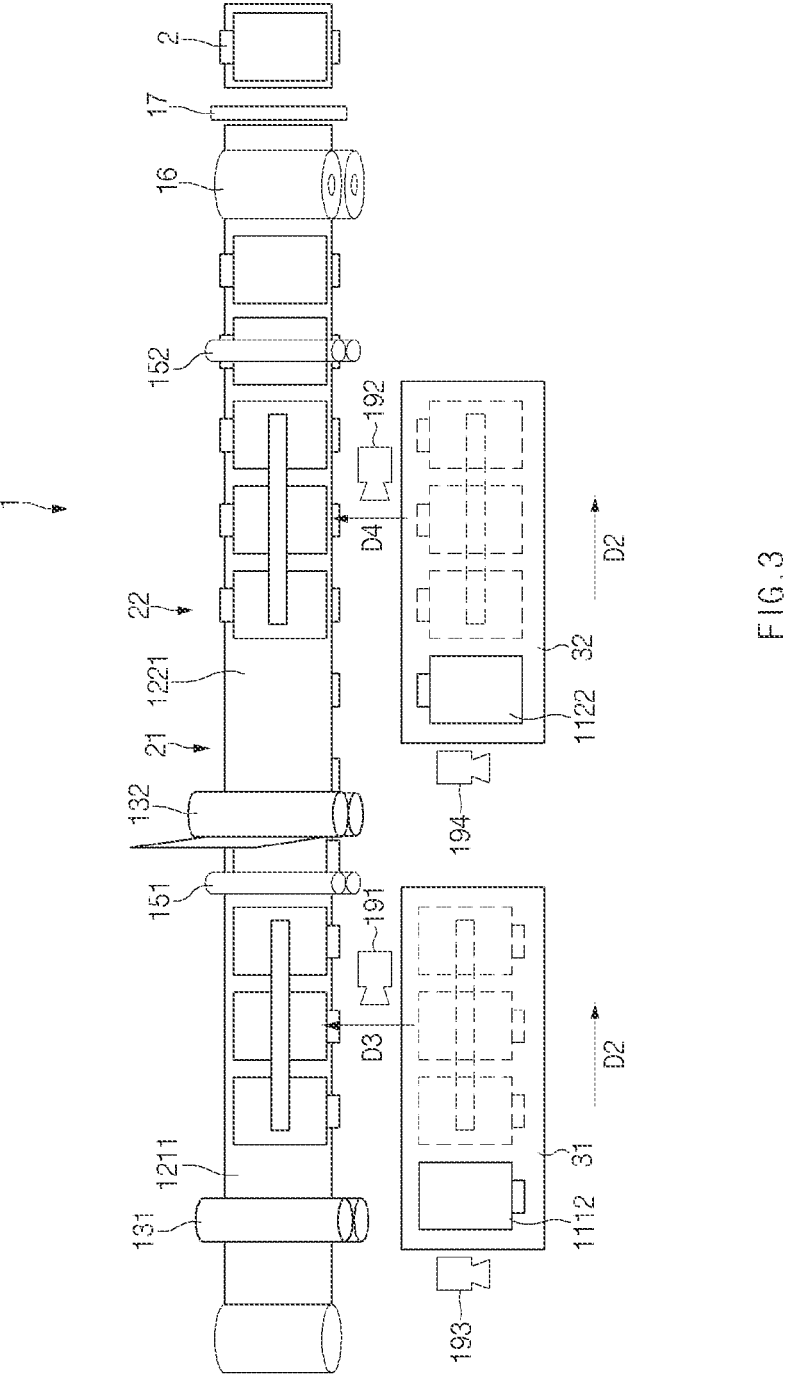
FIG. 3 is a schematic plan view showing in detail the apparatus 1 for manufacturing unit cells according to an embodiment of the present invention.

FIG. 3 is a schematic plan view showing in detail the apparatus 1 for manufacturing unit cells according to an embodiment of the present invention.

As illustrated in FIG. 3, the apparatus 1 for manufacturing unit cells according to an embodiment of the present invention further includes: a first vision sensor 191 which is disposed between the lower separator sheet 1211 and the first conveyor 31 and captures an image of the first electrode 1112 before the first electrode 1112 is placed on the top surface of the lower separator sheet 1211; a second vision sensor 192 which is disposed between the first stack 21 and the second conveyor 32 and captures an image of the second electrode 1122 before the second electrode 1122 is placed on the top surface of the upper separator sheet 1221; a third vision sensor 193 which is disposed above the first conveyor 31 to capture an image of the first electrode 1112; and a fourth vision sensor 194 which is disposed above the second conveyor 32 to capture an image of the second electrode 1122.

The images are acquired as the first to fourth vision sensors 191, 192, 193, and 194 capture the images of specific regions and receive image signals with respect to the specific regions. To this end, the vision sensor generally includes an image capturing element such as a charge coupled device (CCD) or a complementary metal-oxide semiconductor (CMOS). In particular, the first to fourth vision sensors 191, 192, 193, and 194 according to an embodiment of the present invention may capture the images of the first electrode 1112 before placed on the lower separator sheet 1211, the second electrode 1122 before placed on the top surface of the upper separator sheet 1221, the first electrode 1112 moved by the first conveyor 31, and the second electrode 1122 moved by the second conveyor 32, respectively. Accordingly, the images may be acquired.

Meanwhile, although not illustrated in the drawings, the apparatus 1 for manufacturing unit cells according to an embodiment of the present invention may further include a control unit (not shown) which may determine, by using the images of the first electrode 1112 and the second electrode 1122, whether or not the first electrode 1112 and the second electrode 1122 have defects. The control unit may compare the acquired images with pre-stored images of a first electrode 1112 and a second electrode 1122 having good qualities, and identify whether or not the first electrode 1112 and the second electrode 1122 have defects or are damaged with regard to the sizes, shapes, positions, or the like.

The first vision sensor 191 captures the image of the first electrode 1112 before the first electrode 1112 is placed on the top surface of the lower separator sheet 1211. The first vision sensor 191 is disposed between the lower separator sheet 1211 and the first conveyor 31, and may capture an image of a state in which the first electrode 1112 is conveyed while adhering to the first header 141. Accordingly, it is easily identified whether or not the first electrode 1112 has the defect with respect to the position. If there is a defect in position, the position of the first electrode 1112 may be corrected before placed on the lower separator sheet 1211. However, the embodiment is not limited thereto. The first vision sensor may be disposed above the lower separator sheet 1211 to capture an image of the first electrode 1112 placed on the lower separator sheet 1211.

The second vision sensor 192 captures the image of the second electrode 1122 before the second electrode 1122 is placed on the top surface of the upper separator sheet 1221. The second vision sensor 192 is disposed between the first stack 21 and the second conveyor 32, and may capture an image of a state in which the second electrode 1122 is conveyed while adhering to the second header 142. Accordingly, it is easily identified whether or not the second electrode 1122 has the defect with respect to the position. If there is a defect in position, the position of the second electrode 1122 may be corrected before placed on the upper separator sheet 1221. However, the embodiment is not limited thereto. The second vision sensor may be disposed above the first stack 21 to capture an image of the second electrode 1122 placed on the upper separator sheet 1221.

The third vision sensor 193 is disposed above the first conveyor 31, and may capture an image of the first electrode 1112 which is being moved by the first conveyor 31 before the first electrode 1112 adheres to the first header 141. Accordingly, it is easily identified whether or not the first electrode 1112 has defects in quality, position, and the like. If there are defects, the electrode may be eliminated before adhering to the first header 141. However, the embodiment is not limited thereto. The third vision sensor may be disposed above the first electrode magazine 311 to capture an image of the first electrode 1112 before moving to the first conveyor 31.

The fourth vision sensor 194 is disposed above the second conveyor 32, and may capture an image of the second electrode 1122 which is being moved by the second conveyor 32 before the second electrode 1122 adheres to the second header 142. Accordingly, it is easily identified whether or not the second electrode 1122 has defects in quality, position, and the like. If there are defects, the electrode may be eliminated before adhering to the first header 142. However, the embodiment is not limited thereto. The fourth vision sensor may be disposed above the second electrode magazine 321 to capture an image of the second electrode 1122 before moving to the second conveyor 32.

As described above, instead of directly checking the position of the electrode by using the electrode tab, the position of the electrode itself is directly checked by the vision sensor. Accordingly, even when a portion of the electrode tab is damaged, folded, or bent, the position of the electrode may be accurately checked, and thus, the occurrence of defects of the unit cell 2 may be prevented.

According to an embodiment of the present invention, as illustrated in FIG. 3, the first conveyor 31 is disposed close to an input position of the first electrode 1112, and the second conveyor 32 is disposed close to an input position of the second electrode 1122. Thus, the first header 141 conveys the first electrode 1112 in a third direction D3 perpendicular to both the first direction D1 and the second direction D2, and the second header 142 conveys the second electrode 1122 in a fourth direction D4 parallel to the third direction D3 and perpendicular to both the first direction D1 and the second direction D2. That is, all of the first header 141 and the second header 142 move perpendicular to both the first direction D1 and the second direction D2. Accordingly, the first electrode 1112 and the second electrode 1122 may be moved to the appropriate input positions along the shortest route, thus reducing unnecessary movement and efficiently manufacturing the unit cell 2.

Figure 4:
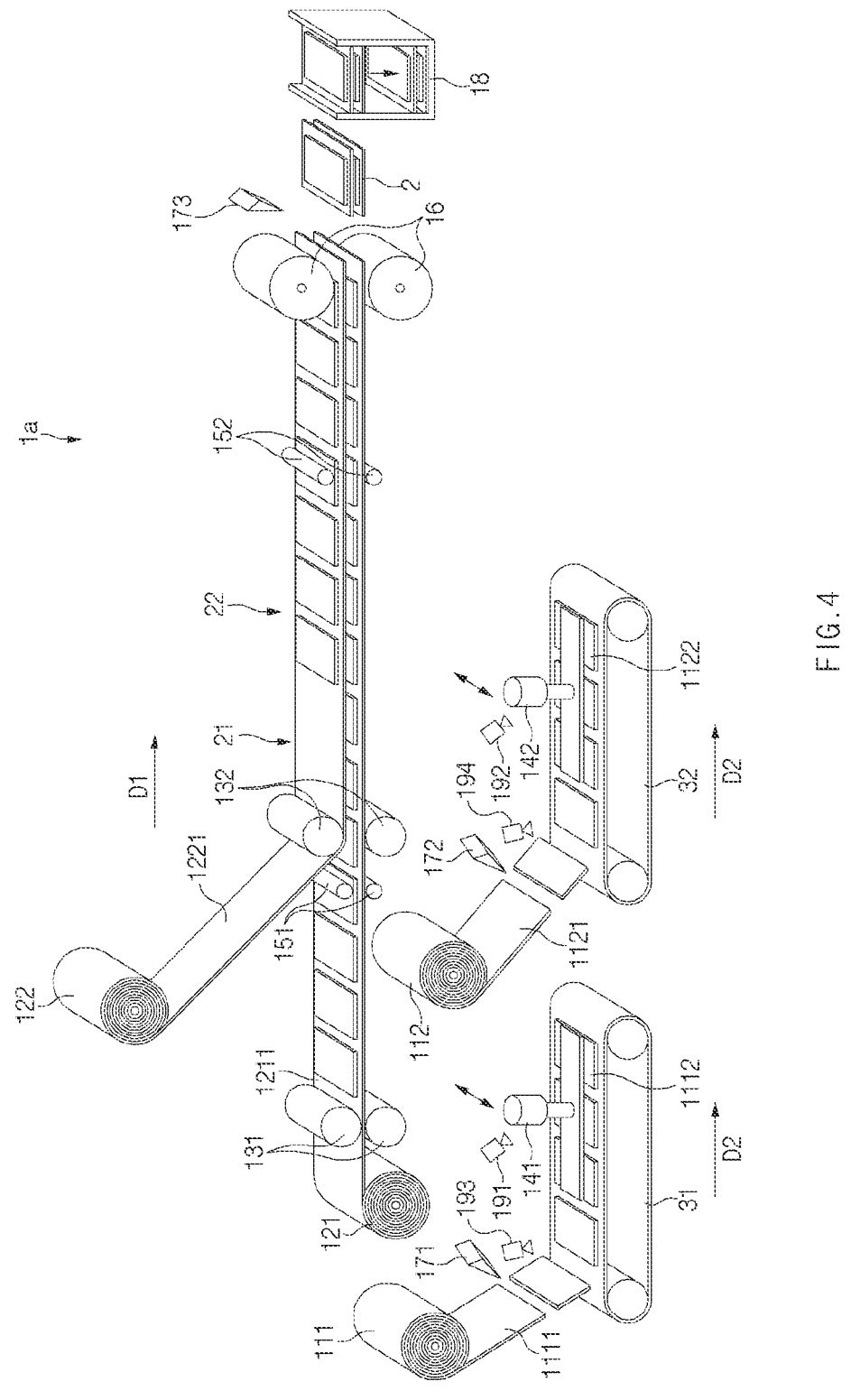
FIG. 4 is a schematic view of an apparatus 1a for manufacturing unit cells according to another embodiment of the present invention.

FIG. 4 is a schematic view of an apparatus 1a for manufacturing unit cells according to another embodiment of the present invention.

According to an embodiment of the present invention, a first electrode 1112 and a second electrode 1122 may be manufactured in separate electrode manufacturing processes and then supplied. However, the apparatus 1a for manufacturing unit cells according to another embodiment of the present invention further includes a first electrode reel 111 from which is unwound a first electrode sheet 1111 in which the first electrode 1112 is formed and a second electrode reel 112 from which is unwound a second electrode sheet 1121 in which the second electrode 1122 is formed. That is, the first electrode 1112 and the second electrode 1122 may be manufactured directly by cutting the first electrode sheet 1111 and the second electrode sheet 1121 in the apparatus 1a for manufacturing unit cells.

The first electrode reel 111 is a reel on which the first electrode sheet 1111 is wound, and the first electrode sheet 1111 is unwound from the first electrode reel 111. Also, the second electrode reel 112 is a reel on which the second electrode sheet 1121 is wound, and the second electrode sheet 1121 is unwound from the second electrode reel 112. A plurality of first electrodes 1112 are formed by cutting the first electrode sheet 1111, and a plurality of second electrodes 1122 are formed by cutting the second electrode sheet 1121.

As illustrated in FIG. 4, according to another embodiment of the present invention, the first electrode sheet 1111 is unwound from the first electrode reel 111. The first electrode sheet 1111 is cut by a first cutter 171, and the first electrode 1112 is formed. Then, the first electrode 1112 is placed on a first conveyor 31, and a third vision sensor 193 disposed above the first conveyor 31 captures an image of the first electrode 1112. Also, the second electrode sheet 1121 is unwound from the second electrode reel 112. The second electrode sheet 1121 is cut by a second cutter 172, and the second electrode 1122 is formed. Then, the second electrode 1122 is placed on a second conveyor 32, and a fourth vision sensor 194 disposed above the second conveyor 32 captures an image of the second electrode 1122. Thus, before the electrodes adhere to the headers, it may be easily identified whether or not the first electrode 1112 and the second electrode 1122 have defects or are damaged with regard to the sizes, shapes, positions, or the like.

Those with ordinary skill in the technical field to which the present invention pertains will understand that the present invention may be implemented in other specific forms without changing the technical idea or essential features. Therefore, the above-described embodiments are to be considered illustrative and not restrictive to all aspects. The scope of the present invention is defined by the appended claims rather than the foregoing detailed description, and various modifications derived from the meaning and scope of the claims and the equivalent concepts thereof should be interpreted as being included in the scope of the present invention.

| [Description of the Symbols] | |
|---|---|
| 1: Apparatus for manufacturing unit cells | 2: Unit cell |
| 16: Heating roller | 17: Cutter |
| 18: Magazine | 21: First stack |
| 22: Second stack | 31: First conveyor |
| 32: Second conveyor | 111: First electrode reel |
| 112: Second electrode reel | 1111: First electrode sheet |
| 1121: Second electrode sheet | 1112: First electrode |
| 1122: Second electrode | 121: Lower separator reel |
| 122: Upper separator reel | 1211: Lower separator sheet |
| 1221: Upper separator sheet | 131: First feeding roller |
| 132: Second feeding roller | 141: First header |
| 142: Second header | 151: First nip roller |
| 152: Second nip roller | 171: First cutter |
| 172: Second cutter | 191: First vision sensor |
| 192: Second vision sensor | 193: Third vision sensor |
| 194: Fourth vision sensor | 311: First electrode |
| 321: Second electrode magazine | magazine |

The invention claimed is:

1. An apparatus for manufacturing unit cells, the apparatus comprising:

a lower separator reel configured for unwinding a lower separator sheet;

a first feeding roller configured to move the lower separator sheet in a first direction;

a first conveyor configured to move a first electrode in a second direction parallel to the first direction;

a first header configured to convey the first electrode from the first conveyor and place the first electrode on a top surface of the lower separator sheet, the first header configured to linearly translate the first electrode in a third direction perpendicular to both the first direction and the second direction when the first electrode arrives at a final position overlying the lower separator sheet;

an upper separator reel configured for unwinding an upper separator sheet;

a second feeding roller configured to move, in the first direction, a first stack in which the lower separator sheet, the first electrode, and the upper separator sheet are stacked in this order;

a second conveyor configured to move a second electrode in the second direction;

a second header configured to convey the second electrode from the second conveyor and place the second electrode on a top surface of the upper separator sheet, the second header configured to linearly translate the second electrode in a fourth direction parallel to the third direction and perpendicular to both the first direction and the second direction when the second electrode arrives at a final position overlying the upper separator sheet; and a cutter configured to cut, at preset intervals, a second stack in which the lower separator sheet, the first electrode, the upper separator sheet, and the second electrode are stacked in this order.

2. The apparatus of claim 1, further comprising a vision sensor which is disposed between the lower separator sheet and the first conveyor and captures an image of the first electrode before the first electrode is placed on the top surface of the lower separator sheet.

3. The apparatus of claim 1, further comprising a vision sensor which is disposed between the first stack and the second conveyor and captures an image of the second electrode before the second electrode is placed on the top surface of the upper separator sheet.

4. The apparatus of claim 1, further comprising a vision sensor which is disposed above the first conveyor to capture an image of the first electrode.

5. The apparatus of claim 1, further comprising a vision sensor which is disposed above the second conveyor to capture an image of the second electrode.

6. The apparatus of claim 1, further comprising nip rollers respectively disposed against the lower separator sheet and the first electrode, wherein when the first electrode is placed on the top surface of the lower separator sheet, the nip rollers press the lower separator sheet and the first electrode while rotating.

7. The apparatus of claim 1, further comprising nip rollers respectively disposed against opposing surfaces of the second stack, wherein the nip rollers press the second stack while rotating.

8. The apparatus of claim 1, further comprising a magazine in which the plurality of unit cells are sequentially stacked.

9. The apparatus of claim 1, wherein the first conveyor and the second conveyor are arranged in a line along the second direction.

10. The apparatus of claim 1, further comprising:

a first electrode reel configured for unwinding a first electrode sheet from which the first electrode is formed; and a second electrode reel configured for unwinding a second electrode sheet from which the second electrode is formed.

11. A method for manufacturing unit cells, the method comprising:

unwinding a lower separator sheet from a lower separator reel and thereby moving the lower separator sheet in a first direction;

moving a first electrode in a second direction parallel to the first direction with a first conveyor;

conveying the first electrode from the first conveyor with a first header and then placing the first electrode on a top surface of the lower separator sheet with the first header, the first header linearly translating the first electrode in a third direction perpendicular to both the first direction and the second direction when the first electrode arrives at a final position overlying the lower separator sheet;

unwinding an upper separator sheet from an upper separator reel and thereby moving the upper separator sheet in the first direction;

stacking the upper separator sheet above the lower separator sheet and on a top surface of the first electrode to form a first stack;

moving a second electrode in the second direction with a second conveyor;

conveying the second electrode from the second conveyor with a second header and then placing the second electrode on a top surface of the upper separator sheet to form a second stack, the second header linearly translating the second electrode in a fourth direction parallel to the third direction and perpendicular to both the first direction and the second direction when the second electrode arrives at a final position overlying the upper separator sheet; and cutting the second stack at preset intervals with a cutter to manufacture a unit cell.

12. The method of claim 11, wherein, in the placing of the first electrode on the top surface of the lower separator sheet, a first vision sensor, which is disposed between the lower separator sheet and the first conveyor, captures an image of the first electrode before the first electrode is placed on the top surface of the lower separator sheet.

13. The method of claim 11, wherein, in the placing of the second electrode on the top surface of the upper separator sheet, a second vision sensor, which is disposed between the first stack and the second conveyor, captures an image of the second electrode before the second electrode is placed on the top surface of the upper separator sheet.

14. The method of claim 11, wherein, in the moving of the first electrode in the second direction, a third vision sensor disposed above the first conveyor captures an image of the first electrode.

15. The method of claim 11, wherein, in the moving of the second electrode in the second direction, a fourth vision sensor disposed above the second conveyor captures an image of the second electrode.

* * * * *